(12) United States Patent
Morrison

(10) Patent No.: US 9,371,918 B2
(45) Date of Patent: Jun. 21, 2016

(54) BALL VALVE FLOAT EQUIPMENT

(71) Applicant: Weatherford Technology Holdings, LLC, Houston, TX (US)

(72) Inventor: Jeffery Morrison, Missouri City, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 222 days.

(21) Appl. No.: 13/625,606

(22) Filed: Sep. 24, 2012

(65) Prior Publication Data

US 2013/0082202 A1 Apr. 4, 2013

Related U.S. Application Data

(60) Provisional application No. 61/541,854, filed on Sep. 30, 2011, provisional application No. 61/608,505, filed on Mar. 8, 2012.

(51) Int. Cl.
| | |
|---|---|
| *F16K 5/06* | (2006.01) |
| *E21B 33/14* | (2006.01) |
| *E21B 34/10* | (2006.01) |
| *E21B 34/00* | (2006.01) |

(52) U.S. Cl.
CPC ............. *F16K 5/0652* (2013.01); *E21B 33/14* (2013.01); *E21B 34/10* (2013.01); *E21B 2034/002* (2013.01)

(58) Field of Classification Search
CPC ... E21B 2034/002; E21B 34/10; E21B 34/12; E21B 33/14; F16K 5/0652; F16K 5/0647; F16K 5/06
USPC ......... 166/285, 374, 386, 332.3, 334.2, 242.8
See application file for complete search history.

(56) References Cited

U.S. PATENT DOCUMENTS

| | | | | |
|---|---|---|---|---|
| 2,974,922 | A | | 3/1961 | Keithahn |
| 3,236,255 | A | * | 2/1966 | Sizer ............................ 137/494 |
| 3,273,650 | A | * | 9/1966 | Alexander et al. ............ 166/317 |
| 3,292,706 | A | * | 12/1966 | Grimmer et al. .............. 166/322 |
| 3,398,762 | A | * | 8/1968 | Fredd ............................ 137/495 |
| 3,414,061 | A | | 12/1968 | Nutter |
| 3,433,252 | A | * | 3/1969 | Kennard ....................... 137/496 |
| 3,627,045 | A | | 12/1971 | Lebourg |
| 3,667,505 | A | | 6/1972 | Radig |
| RE27,464 | E | * | 8/1972 | Taylor, Jr. ..................... 166/363 |
| 3,703,193 | A | * | 11/1972 | Raulins ......................... 137/630 |
| 3,724,475 | A | * | 4/1973 | Ruppel ........................... 137/67 |
| 3,732,925 | A | * | 5/1973 | Kanady ........................... 166/72 |
| 3,765,443 | A | * | 10/1973 | Young ........................... 137/460 |
| 3,827,494 | A | * | 8/1974 | Crowe ........................... 166/322 |
| 3,856,085 | A | * | 12/1974 | Holden et al. ................. 166/264 |

(Continued)

OTHER PUBLICATIONS

PCT Search Report and Written Opinion for International Application No. PCT/US2012/057217 dated Jul. 22, 2013.

(Continued)

*Primary Examiner* — Jennifer H Gay
(74) *Attorney, Agent, or Firm* — Patterson & Sheridan, LLP

(57) ABSTRACT

A ball valve for use in a cementing operation includes a housing; a spherical body disposed within the housing; and an actuating member movable relative to the housing. The actuating member is movable between a first position and a second position, wherein the movement of the actuating member causes the spherical body to rotate within the housing.

45 Claims, 13 Drawing Sheets

(56) References Cited

U.S. PATENT DOCUMENTS

| | | | |
|---|---|---|---|
| 3,860,066 A * | 1/1975 | Pearce et al. | 166/72 |
| 3,870,101 A * | 3/1975 | Helmus | 166/363 |
| 3,967,647 A * | 7/1976 | Young | 137/614.11 |
| 3,976,136 A * | 8/1976 | Farley et al. | 166/264 |
| 4,377,179 A | 3/1983 | Giebeler | |
| 4,542,792 A * | 9/1985 | Akkerman | 166/374 |
| 4,550,780 A * | 11/1985 | Mott | 166/323 |
| 4,557,333 A | 12/1985 | Beck | |
| 4,565,213 A * | 1/1986 | Giebeler | 137/494 |
| 4,618,000 A * | 10/1986 | Burris, II | 166/373 |
| 4,619,325 A * | 10/1986 | Zunkel | 166/374 |
| 4,627,492 A * | 12/1986 | MacLaughlin | 166/250.08 |
| 4,766,960 A * | 8/1988 | Williamson, Jr. | 166/321 |
| 4,903,775 A * | 2/1990 | Manke | 166/373 |
| 5,222,559 A * | 6/1993 | Edwards et al. | 166/321 |
| 5,782,304 A * | 7/1998 | Garcia-Soule et al. | 166/356 |
| 6,250,383 B1 * | 6/2001 | Patel | 166/70 |
| 6,401,824 B1 * | 6/2002 | Musselwhite et al. | 166/327 |
| 6,708,946 B1 * | 3/2004 | Edwards et al. | 251/58 |
| 7,204,315 B2 * | 4/2007 | Pia | 166/373 |
| 7,866,391 B2 * | 1/2011 | Wardley et al. | 166/285 |
| 2001/0023764 A1 * | 9/2001 | Patel | 166/375 |
| 2002/0000317 A1 * | 1/2002 | Rayssiguier et al. | 166/285 |
| 2002/0148615 A1 * | 10/2002 | Szarka et al. | 166/332.4 |
| 2003/0029611 A1 | 2/2003 | Owens | |
| 2003/0062161 A1 * | 4/2003 | Mondelli et al. | 166/291 |
| 2003/0150621 A1 * | 8/2003 | Pia | 166/373 |
| 2004/0035586 A1 * | 2/2004 | Gudmestad et al. | 166/373 |
| 2006/0272825 A1 * | 12/2006 | Royer | 166/373 |
| 2008/0041583 A1 * | 2/2008 | Angman et al. | 166/207 |
| 2008/0110632 A1 * | 5/2008 | Beall | 166/332.3 |
| 2008/0196903 A1 * | 8/2008 | Wardley et al. | 166/382 |
| 2008/0283244 A1 | 11/2008 | Barbee | |
| 2010/0084146 A1 * | 4/2010 | Roberts | 166/386 |
| 2012/0018172 A1 * | 1/2012 | Javed | 166/382 |
| 2013/0220609 A1 | 8/2013 | Rytlewski | |

OTHER PUBLICATIONS

Australian Patent Examination Report dated Apr. 22, 2015, for Australian Patent Application No. 2012316205.

Canadian Office Action dated Jul. 7, 2015, for Canadian Patent Application No. 2,849,979.

* cited by examiner

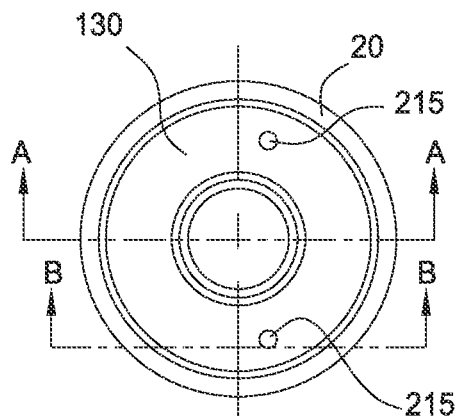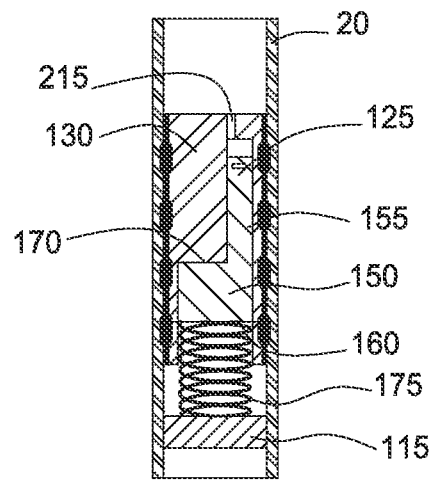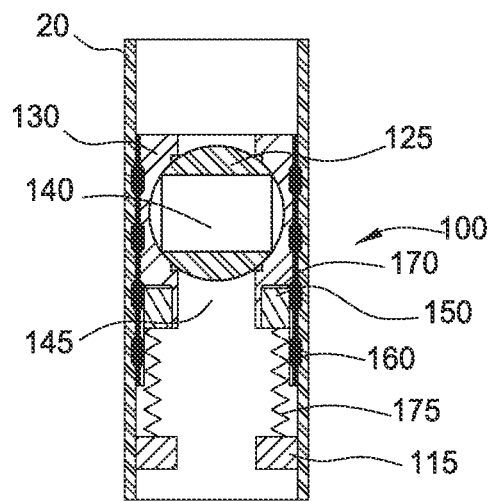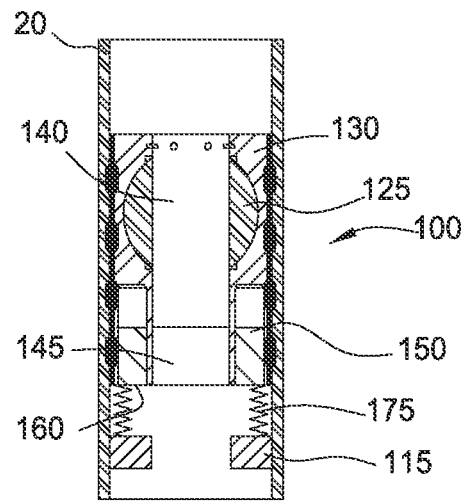

BALL VALVE FLOAT EQUIPMENT

CROSS-REFERENCE TO RELATED APPLICATIONS

This application claims benefit of U.S. provisional patent application Ser. No. 61/541,854, filed Sep. 30, 2011, and U.S. provisional patent application Ser. No. 61/608,505, filed Mar. 8, 2012 . Each of the aforementioned related patent applications is herein incorporated by reference.

BACKGROUND OF THE INVENTION

1. Field of the Invention

Embodiments of the invention generally relate to a cementing operation. More particularly, embodiments of the invention relate to a ball valve for use during a cementing operation.

2. Description of the Related Art

In the drilling of oil and gas wells, a wellbore is formed using a drill bit that is urged downwardly at a lower end of a drill string. After drilling a predetermined depth, the drill string and bit are removed and the wellbore is lined with a string of casing. An annular area is thus formed between the string of casing and the wellbore. A cementing operation is then conducted in order to fill the annular area with cement. The combination of cement and casing strengthens the wellbore and facilitates the isolation of certain areas of the formation behind the casing for the production of hydrocarbons.

During a cementing operation, a float shoe is attached to the bottom of the casing string as the casing string is run into the wellbore. The float shoe typically has a one-way valve located within the shoe. The casing is run into the wellbore to the desired depth and a cementing operation is performed. The cementing operation commences with a first plug being dropped into the casing. The first plug typically has a through bore with a rupture disk therein. Behind the plug, cement is pumped into the casing. Following the cement, a second typically solid plug is dropped into the casing. The first plug lands on the float shoe. As the pressure of the cement behind the first plug increases, the rupture disk fails. The cement flows through the bore of the first plug and past the one-way valve in the float shoe until the second plug reaches the first plug. The one-way valve allows the cement to flow out of the float shoe and into the annulus between the casing and a wellbore therearound, while preventing the cement from reentering the casing string. Typically, the one-way valve in the float shoe includes a flapper valve or a poppet valve. However, these valves are not designed to hold wellbore pressure. Therefore, there is a need for a valve that can hold wellbore pressure.

SUMMARY OF THE INVENTION

Embodiments of the invention generally relate to a ball valve assembly for use during a cementing operation. In one aspect, a ball valve is provided. The ball valve includes a housing. The ball valve further includes a spherical body disposed within the housing. Additionally, the ball valve includes an actuating member movable relative to the housing between a first position and a second position, wherein the movement of the actuating member causes the spherical body to rotate within the housing.

In another aspect, a method of using a ball valve in a cementing operation is provided. The method includes the step of positioning a casing in a wellbore, wherein the casing includes the ball valve with a spherical body in an opened position. The method further includes the step of pumping cement through the casing and the ball valve into an annulus formed between the casing and the wellbore. Additionally, the method includes the step of moving the spherical body of the ball valve from the opened position to a closed position.

In another aspect, a valve assembly is provided. The valve assembly includes a housing. The valve assembly further includes a spherical body having a bore. The spherical body is rotatable within the housing between an opened position in which the bore of the spherical body aligns with a bore of the housing and a closed position in which the bore of the spherical body is misaligned with the bore of the housing, and wherein the spherical body is biased in the closed position. The valve assembly further includes an actuating member configured to move the spherical body between the opened position and the closed position.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5 illustrates an upper view of the valve assembly.

FIG. 5A illustrates a view taken along line A-A in FIG. 5.

FIG. 5B illustrates a view taken along line B-B in FIG. 5.

FIG. 6 illustrates a view of the valve assembly in the opened position.

DETAILED DESCRIPTION

Embodiments of the invention generally relate to a valve assembly for use during a cementing operation. The valve assembly will be described herein in relation to a float shoe and a shoe track. It is to be understood, however, that the valve assembly may also be used as a cement shoe without departing from principles of the invention. To better understand the novelty of the valve assembly and the methods of use thereof, reference is hereafter made to the accompanying drawings.

Figure 1:
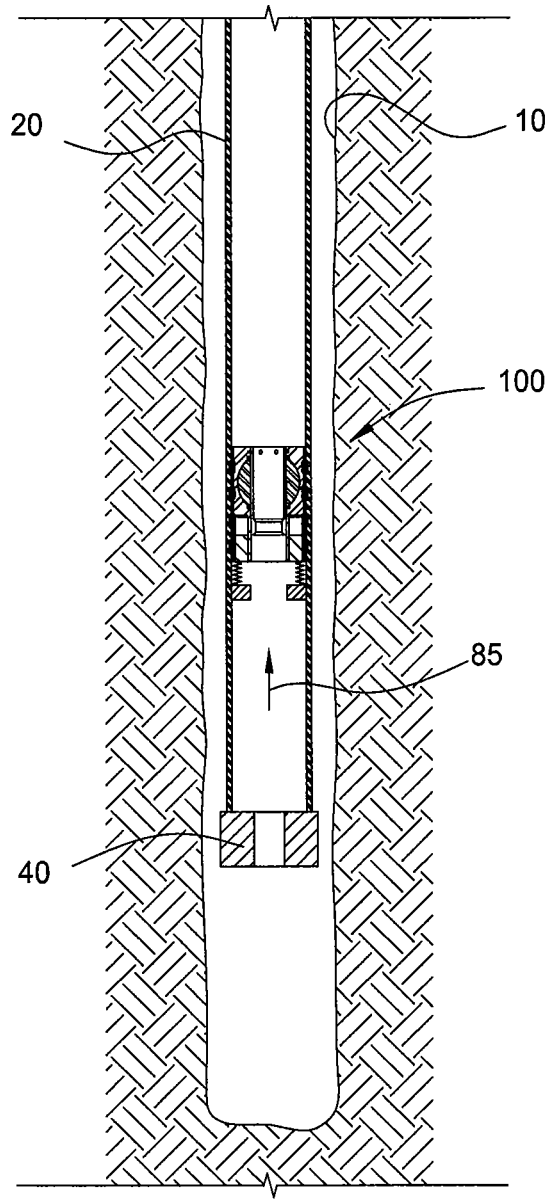
FIG. 1 illustrates a view of a valve assembly.

FIG. 1 illustrates a view of a valve assembly 100. As shown, the valve assembly 100 is attached to a casing 20. At the lower end of the casing 20 is a shoe 40. As the casing 20 is being lowered into a wellbore 10, wellbore fluid enters the casing 20 by flowing through the shoe 40 and the valve assembly 100 in the direction indicated by arrow 85.

Figure 1A:
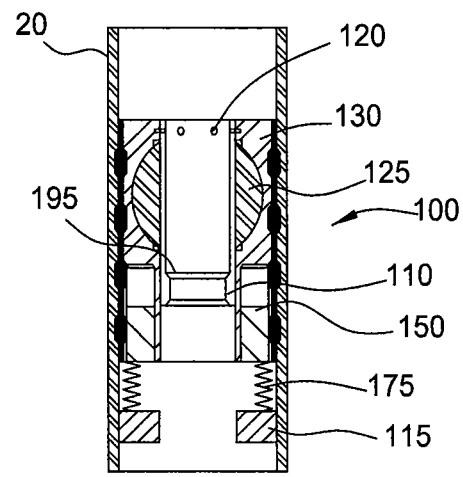
FIGS. 1A and 1B illustrate enlarged views of the valve assembly shown in FIG. 1.

FIG. 1A is an enlarged view of the valve assembly 100 shown in FIG. 1. The valve assembly 100 is in an opened position, which allows fluid flow through the valve assembly 100. The valve assembly 100 is held in the open position by a sleeve member 110. The sleeve member 110 is attached to a housing 130 via a releasable connection 120, such as a shear screw. As described herein, the sleeve member 110 is configured to be removed from the valve assembly 100 at a predetermined time. After the sleeve member 110 is removed from the valve assembly 100, the valve assembly 100 may be moved between an opened position (FIG. 3A) and a closed position (FIG. 4A) any number of times. The sleeve member 110 includes a seat 195 configured to receive a fluid-blocking member (not shown).

Figure 1B:
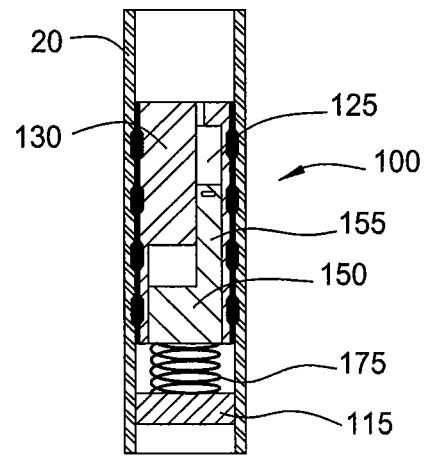

The valve assembly 100 includes a spherical body 125 that is rotatable within a housing 130. The body 125 is connected to an actuating member 150 via an arm 155 (FIG. 1B). In one embodiment, the actuating member 150 is a piston member. As the actuating member 150 moves axially in the casing 20, the arm 155 connected between the body 125 and the actuating member 150 causes the body 125 to rotate within the housing 130 as described herein. In one embodiment, the spherical body 125 rotates a quarter turn. The arm 155 may be configured as a scotch yoke, which is a mechanism for converting the linear motion of a slider into rotational motion. For example, the actuating member 150 is directly coupled to a sliding yoke with a slot (see FIG. 3B) that engages a pin on the spherical body 125. As the actuating member 150 moves axially, the pin and the slot interact this causes the body 125 to rotate within the housing 130.

As shown, the arm 155 is connected between the actuating member 150 and the body 125. In another embodiment, a rack and pinion arrangement may be used between the actuating member 150 and the body 125. A rack and pinion arrangement is a linear actuator that includes gears which convert linear motion into rotational motion. The circular pinion may be attached to the body 125. The pinion engages teeth on a rack that is attached to the actuating member 150. As the actuating member 150 moves axially in the casing 20, the rack will interact with the pinion attached to the body 125 which causes the body 125 to rotate within the housing 130.

The valve assembly 100 further includes a biasing member 175 disposed between the actuating member 150 and a support 115. The biasing member 175 may be springs, washers, elastomers or any other type of biasing member known in the art. The biasing member 175 is configured to push (or bias) the actuating member 150 toward the housing 130. Additionally, FIGS. 1A and 1B illustrate one biasing member; however, there may be any number of biasing members, without departing from principles of the invention. As shown in FIGS. 3A and 4A, the biasing member 175 moves between a first axial position and a second axial position as the actuating member 150 moves relative to the housing 130. In another embodiment, the biasing member 175 may be a torsional biasing member, such as a torsional spring, which causes the valve assembly 100 to move between the opened position and the closed position in a similar manner as described herein.

Figures 2, 2A:
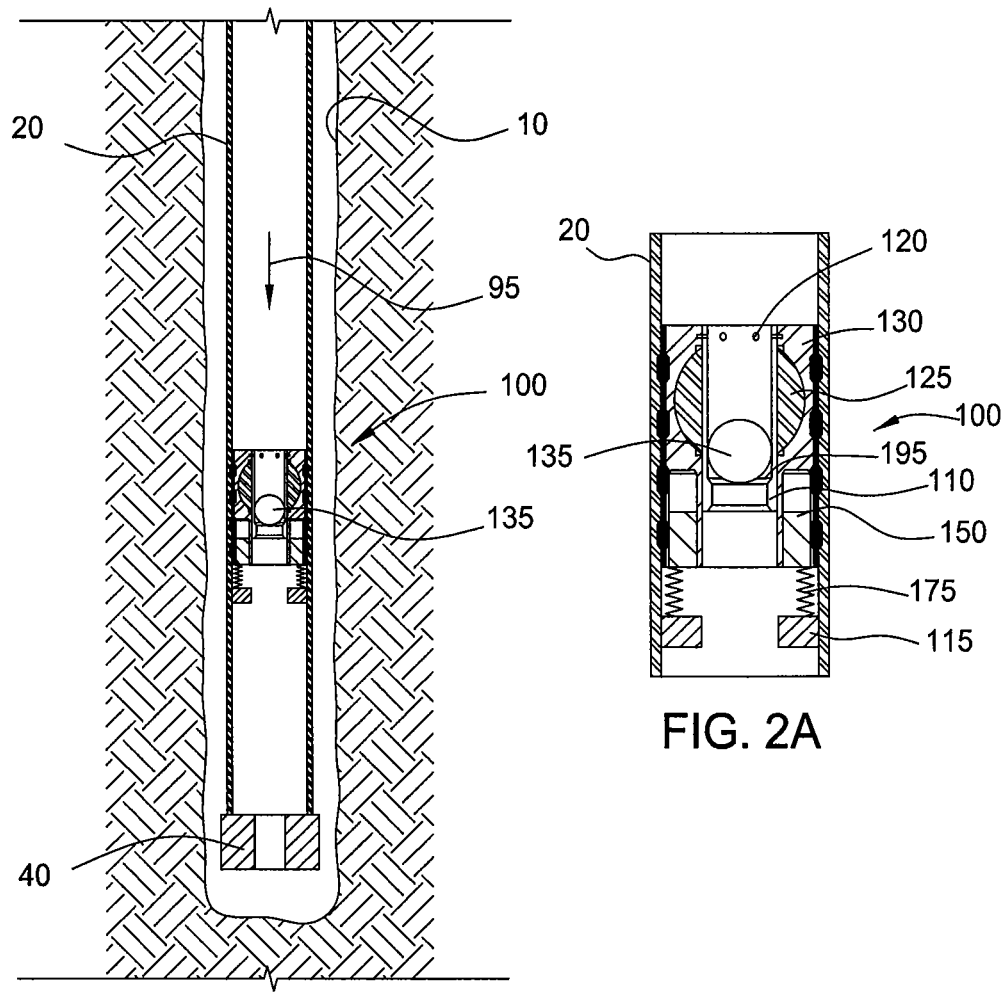
FIG. 2 illustrates a view of a fluid-blocking member in the valve assembly.
FIG. 2A illustrates an enlarged view of the valve assembly shown in FIG. 2.

FIG. 2 illustrates a view of a fluid-blocking member 135 in the valve assembly 100. After the casing 20 has been positioned within the wellbore 10, the fluid-blocking member 135 is dropped or pumped through the casing 20 from the surface of the well. The fluid-blocking member 135 may be a ball, a dart or any other fluid-blocking member. The fluid-blocking member 135 moves through the casing 20 in the direction indicated by arrow 95 until it lands in the seat 195 in the sleeve member 110 (FIG. 2A). After the fluid-blocking member 135 is positioned in the seat 195, fluid flow through the casing 20 is blocked in a first direction, which is indicated by arrow 95. Thereafter, fluid is pumped into the casing 20 from the surface to create a fluid pressure in the valve assembly 100. At a predetermined fluid pressure, the releasable connection 120 between the sleeve member 110 and the housing 130 is released, thereby allowing the sleeve member 110 to move relative to the housing 130. Thereafter, the sleeve member 110 will drop out of the valve assembly 100 and land in the wellbore or in a portion of casing 20 (not shown). In another embodiment, the fluid-blocking member 135 may be part of the valve assembly 100 rather than being dropped from the surface of the well. In this embodiment, the fluid-blocking member is movable within the valve assembly 100 in a manner that allows fluid flow through the valve assembly 100 in the direction indicated by arrow 85, while it blocks fluid flow through the valve assembly 100 in the direction indicated by arrow 95.

Figure 3:
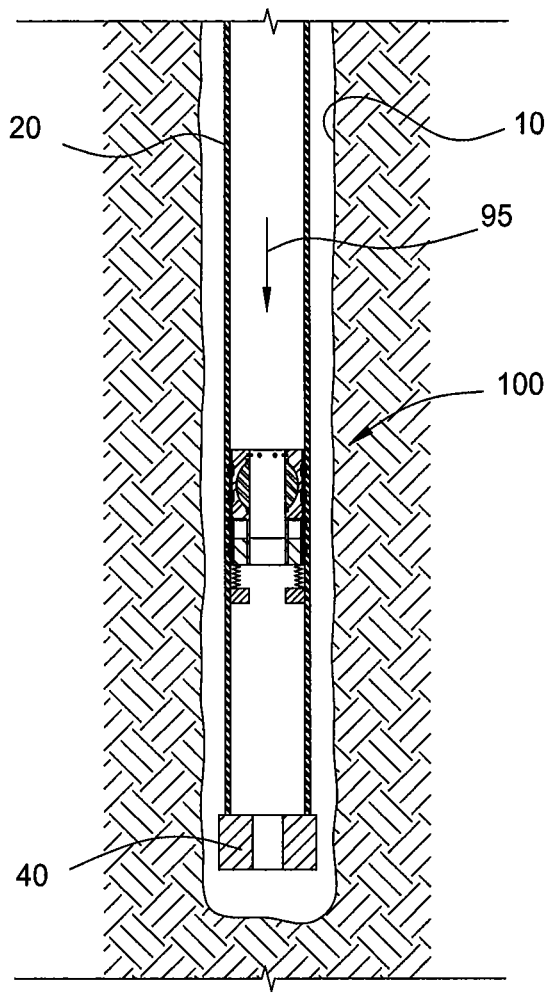
FIGS. 3 and 3A illustrate views of the valve assembly in an opened position.
Figure 3A:
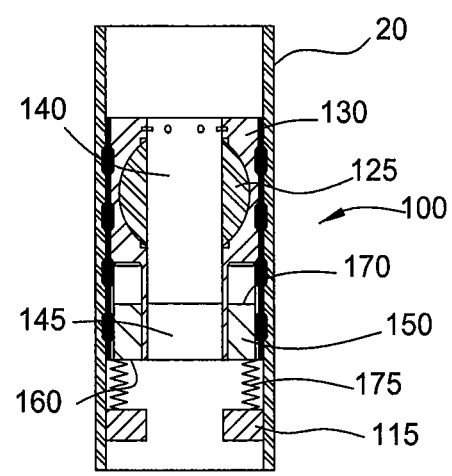

FIGS. 3 and 3A illustrate views of the valve assembly 100 in the opened position. In the opened position, a bore 140 of the body 125 is substantially aligned with a bore 145 of the actuating member 150. As a result, fluid may flow through the valve assembly 100 in the direction indicated by arrow 95.

Figure 3B:
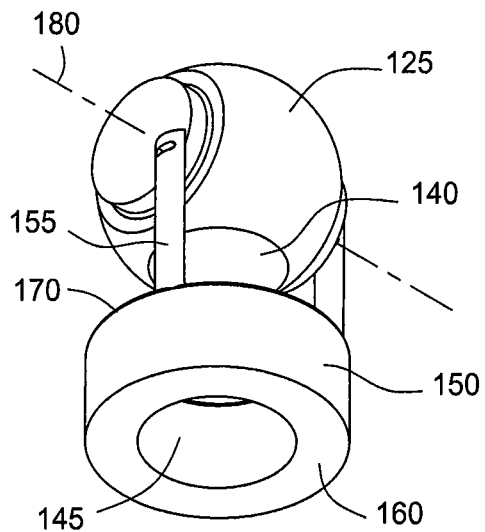
FIG. 3B illustrates a piston and a spherical body of the valve assembly when the valve assembly is in the opened position.

As shown in FIG. 3A, the actuating member 150 includes a first surface 160 and a second surface 170. As fluid flows through the bore 140 of the body 125 in the direction indicated by arrow 95, the fluid creates a force that acts on the second surface 170 of the actuating member 150. The force applied to the second surface 170 causes the actuating member 150 to move in the direction indicated by arrow 95 toward the support 115. At the same time, the biasing member 175 is compressed between the first surface 160 and the support 115. As fluid flow is reduced, the force that acts on the second surface 170 of the actuating member 150 is reduced. When the force on the second surface 170 of the actuating member 150 becomes less than the force on the first surface 160 of the actuating member 150 generated by the biasing member 175, the actuating member 150 moves toward the housing 130. As a result, the arm 155 connected between the actuating member 150 and the body 125 causes the body 125 to rotate around axis 180 (FIG. 3B).

As shown, the actuating member 150 is an annular member that includes the first surface 160 and the second surface 170 to move the actuating member 150 along a longitudinal axis of the casing 20. In another embodiment, the piston may comprise two solid rods (not shown) attached to the spherical body. Each rod has a first surface and a second surface. As fluid is pumped through the casing in the direction indicated by arrow 95, the fluid creates a force that acts on the second surface of each solid rod, which causes each solid rod to move in the direction indicated by arrow 95 and compress a biasing member that is engaged with the first surface of each solid rod. As fluid flow is reduced, the force that acts on the second surface of each solid rod is reduced. When the force on the second surface of each solid rod becomes less than the force on the first surface generated by the compressed biasing member, the solid rods move toward the housing 130. As a result, the body rotates around axis 180 (FIG. 3B).

Figure 4:
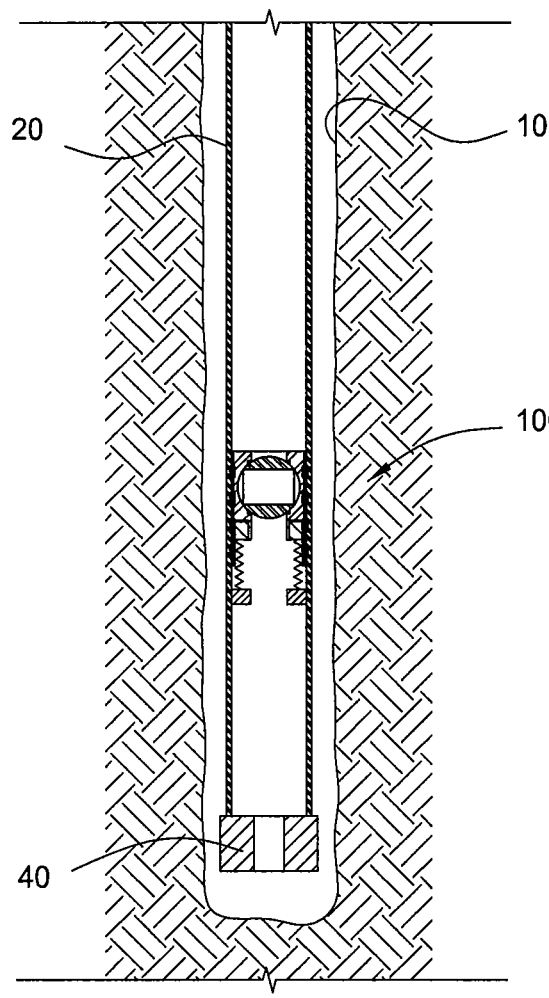
FIGS. 4 and 4A illustrate views of the valve assembly in an opened position.
Figure 4A:
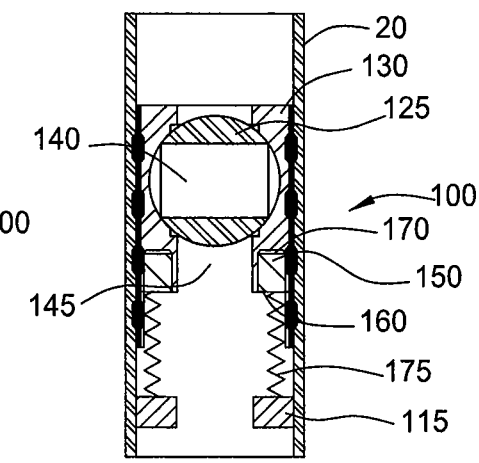

FIGS. 4 and 4A illustrate views of the valve assembly 100 in the closed position. In the closed position, the bore 140 of the body 125 is misaligned with the bore 145 of the actuating member 150. As a result, fluid flow through the valve assembly 100 is blocked. As set forth herein, the biasing member 175 is configured to push (or bias) the actuating member 150 toward the housing 130. The movement of the actuating member 150 in the direction of the housing 130 causes the body 125 to rotate around axis 180 (FIG. 4B) such that the valve assembly 100 is in the closed position. Additionally, wellbore fluid from the wellbore 10 may create a force that acts on the first surface 160 of the actuating member 150, which in turn causes the actuating member 150 to move in the direction of the housing 130. In this manner, the valve assembly 100 is biased in the closed position.

As shown in FIG. 4A, the spherical body 125 has rotated within the housing 130 such that the bore 140 is no longer in fluid communication with the bore 145 of the actuating member 150. As also shown, the biasing member 175 has moved from a compressed state (FIG. 3A) to an uncompressed state (FIG. 4A). The valve assembly 100 may be moved from the closed position to the opened position by pumping fluid down the casing 20.

FIG. 5 illustrates an upper view of the valve assembly 100. As shown in FIG. 5, a hole 215 (or several holes) is formed in the housing 130. The hole 215 is configured to be a fluid passageway through the housing 130, such that fluid that is pumped from the surface through the casing 20 may be directed toward the actuating member 150.

FIG. 5A illustrates a view taken along line A-A in FIG. 5. As shown in FIG. 5A, the biasing member 175 has urged the actuating member 150 toward the housing 130, which results in the valve assembly 100 being in the closed position. In other words, the bore 140 of the body 125 is misaligned with the bore 145 of the actuating member 150. Thus, fluid flow through the valve assembly 100 is blocked.

FIG. 5B illustrates a view taken along line B-B in FIG. 5. As shown, the hole 215 provides a fluid passageway through the housing 130. As fluid is pumped through the casing 20, a portion of the fluid flows through the hole 215 and creates a force that acts on the second surface 170 of the actuating member 150. When the force on the second surface 170 of the actuating member 150 becomes greater than the force on the first surface 160 of the actuating member 150 generated by the biasing member 175, the actuating member 150 moves in the direction of the support 115. As a result, the arm 155 connected between the actuating member 150 and the body 125 causes the body 125 to rotate around axis 180 (FIG. 3B) to move the valve assembly 100 to the opened position as shown in FIG. 6. In the opened position, the bore 140 of the body 125 is substantially aligned with the bore 145 of the actuating member 150, which allows fluid flow through the valve assembly 100. The fluid creates a force that acts on the second surface 170 of the actuating member 150. The valve assembly 100 will remain in the opened position as fluid is pumped through the valve assembly 100. As fluid flow is reduced, the force that acts on the second surface 170 of the actuating member 150 is reduced. When the force on the second surface 170 of the actuating member 150 becomes less than the force on the first surface 160 of the actuating member 150 generated by the biasing member 175, the actuating member 150 moves toward the housing 130. As a result, the arm 155 connected between the actuating member 150 and the body 125 causes the body 125 to rotate around axis 180 (FIG. 4B) back to the closed position. The valve assembly 100 is movable between the opened position and the closed position any number of times by pumping fluid through the casing 20 and then reducing fluid flow as described herein.

Figure 7:
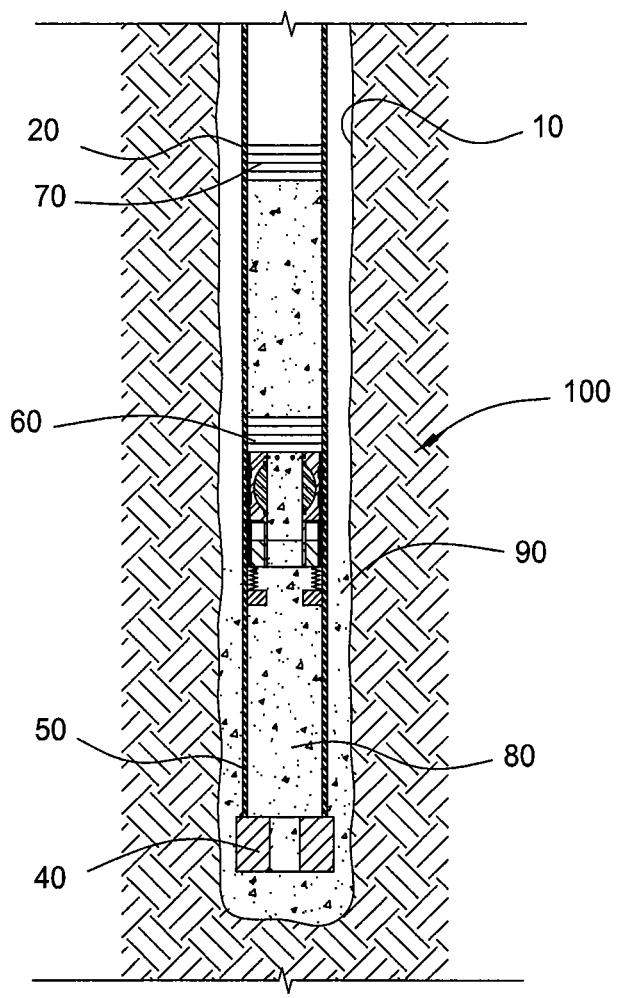
FIG. 7 illustrates a view of the valve assembly during a cementing operation.

FIG. 7 illustrates a view of valve assembly 100 during a cementing operation. During the cementing operation, a first plug 60 is dropped (pumped) through the casing 20. The first plug 60 is followed by cement 80, which will be used for cementing an annulus 90 formed between the casing 20 and the wellbore 10. After the cement 80 is placed in the casing 20, a second plug 70 is dropped into the casing 20. The second plug 70 is pushed downhole by a pumping fluid, not shown. The pumping fluid may be any fluid capable of pushing the second plug 70 through the casing 20, such as drilling mud, water, etc. The first plug 60 travels down the casing 20 until it lands on the valve assembly 100. With the first plug 60 engaged with the valve assembly 100, a bump pressure is created between the first plug 60 and the valve assembly 100. As the pumping fluid pressure increases behind the second plug 70, the pressure increases in the cement 80 thereby increasing bump pressure on the valve assembly 100. The bump pressure increases until a rupture disk (not shown) bursts on the first plug 60. With the rupture disk burst, the cement 80 flows through the first plug 60 and into the valve assembly 100. Initially when the rupture disk bursts, a portion of the bump pressure is relieved from the top of the valve assembly 100. The fluid pressure of the cement 80 may then open the valve assembly 100. The cement 80 then flows past the valve assembly 100 and into a shoe track 50 between the valve assembly 100 and the shoe 40. Thereafter, the cement 80 flows out through the shoe 40 and into the annulus 90. The cement 80 continues to flow out into the annulus 90 until the second plug 70 lands on the first plug 60. With the second plug 70 on the first plug 60, continued pressuring of the pumping fluid increases the bump pressure on the valve assembly 100. The valve assembly 100 may then close in order to prevent the cement 90 from flowing back into the casing 20 or U-tubing.

Figure 8:
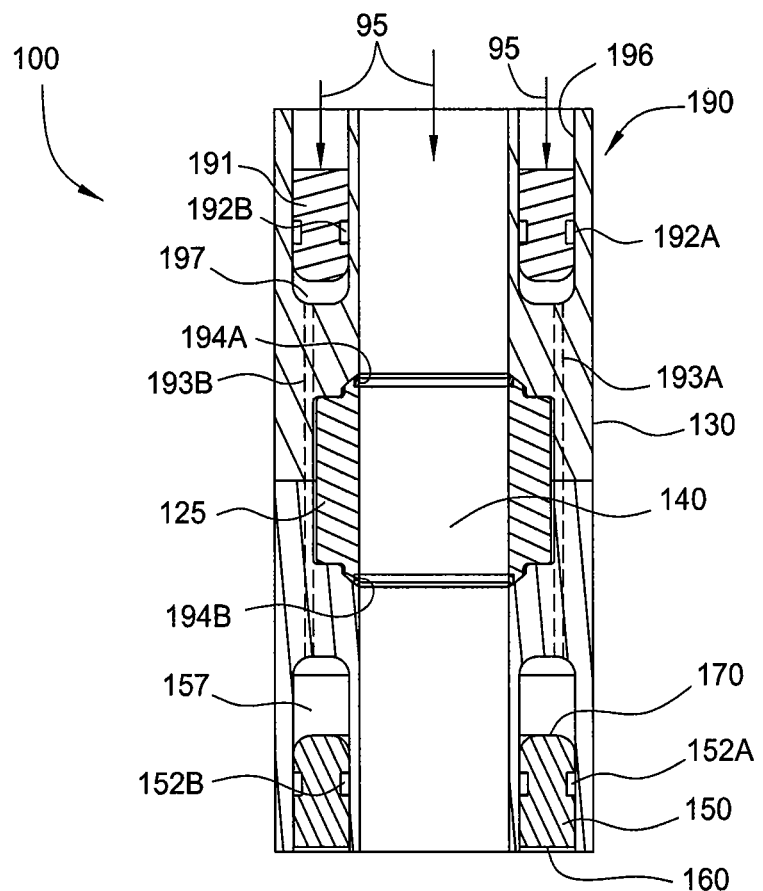
FIG. 8 illustrates a sectional view of the valve assembly including a piston assembly according to one embodiment.

FIG. 8 illustrates a sectional view of the valve assembly 100 according to one embodiment. The valve assembly 100 may include a floating or balanced piston assembly 190. The piston assembly 190 may be configured to prevent wellbore fluids and/or debris from flowing into the area of the housing 130 where the actuating member 150 interacts with the body 125 to open and close fluid flow through the valve assembly 100. The piston assembly 190 also may be configured to actuate the actuating member 150 to rotate the body 125 into the open position to open fluid flow through the valve assembly 100.

The piston assembly 190 may include a piston 191 movably disposed in a recess 196 formed in the housing 130. One or more seals 192A, 192B may be disposed between the piston 191 and the recess 196 walls, thereby forming a sealed chamber 197. One or more flow paths 193A, 193B may be disposed through the housing 130 to provide fluid communication to a sealed chamber 157, which is formed by one or more seals 152A, 1526 disposed between the actuating member 150 and the housing 130. The chambers 197, 157, and/or the flow paths 193A, 193B may be pre-filled with a fluid, such as an incompressible hydraulic fluid. The body 125 may also be provided with one or more wiper rings 194A, 194B adjacent the openings into the bore 140 of the body 125. The wiper rings 194A, 194B may be configured to prevent debris from leaving the bore 140 of the body 125 when it is moved to the closed position.

In operation, pressurized fluid may be supplied from the surface through the casing 20 (illustrated in FIG. 3) in the direction of the arrows 95. The pressurized fluid may apply a force to the upper end of the piston 191 and move the piston 191 further into the recess 196 of the housing 130, thereby pressurizing or increasing the pressure of the fluid in the chambers 197, 157 and the flow paths 193A, 193B. The pressurized fluid in the chamber 157 may apply a force to the second surface 170 of the actuating member 150, and move the actuating member 150 in a downward direction away from the body 125 and against the bias of the biasing member 175 (illustrated in FIG. 3A). As a result, the arm 155 connected between the actuating member 150 and the body 125 causes the body 125 to rotate and move into the opened position to permit fluid flow through the valve assembly 100 (illustrated in FIG. 3B).

In further operation, the pressurized fluid in the direction of the arrows 95, and/or the pressurized fluid in the chambers 197, 157 may be reduced to a force below the force of the biasing member 175 acting on the first surface 160 of the actuating member 150. The biasing member 175 may move the actuating member 150 in an upward direction into the housing 130 to actuate the body 125 into the closed position via the arm 155. As the actuating member 150 moves toward the body 125, the fluid in the chambers 197, 157 and/or the flow paths 193A, 193B may be pressurized or increase in pressure to apply a force to the bottom surface of the piston 191. The piston 191 may be moved within the housing 130 in an upward direction away from the body 125, but may be prevented from being fully removed from the recess 196 of the housing 130 (such as by the retaining member 22A further described below). The piston 191 may float within the recess 196 of the housing 130 throughout operation of the valve assembly 100 to prevent debris from obstructing the operation of the body 125, and to actuate the actuating member 150 using pressurized fluid.

Figure 9:
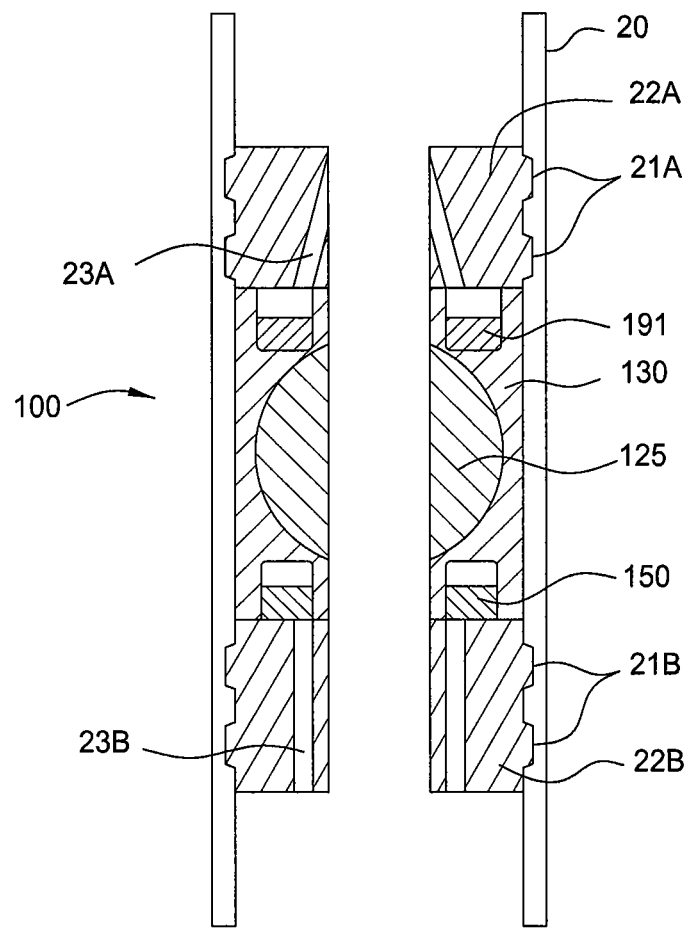
FIG. 9 illustrates a sectional view of the valve assembly secured in a casing according to one embodiment.

FIG. 9 illustrates the valve assembly 100 secured in a section of the casing 20. The casing 20 may include one or more wickers 21A, 21B disposed above and below the valve assembly 100. The wickers 21A, 21B may be one or more recess disposed on the inner surface of the casing 20. The wickers 21A, 21B may be filled with a retaining material, such as cement, to form retaining members 22A, 22B above and below the valve assembly 100. The retaining members 22A, 22B may engage the inner surface of the casing 20, including the wickers 21A, 21B, as well as the housing 130 to thereby provide axial restraint of the valve assembly 100 within the casing 20. When desired, the retaining members 22A, 22B may be drilled out to remove the valve assembly 100 from the casing 20.

The retaining members 22A, 22B may each include one or more flow paths 23A, 23B for fluid communication with the piston 191 and the actuating member 150, respectively. Pressurized fluid flow through the flow paths 23A may apply a force to the piston 191 to actuate the valve assembly 100 into the open position as described above with respect to FIG. 8. As illustrated, the flow paths 23A may be arranged at an angle with respect to the longitudinal axis of the casing 20 or may intersect the bore of the housing 130 so that fluid passage through the flow paths 23A is not obstructed by the plugs 60, 70, which land on top of the retaining member 22A during a cementing operation as illustrated in FIG. 7. In addition to or as an alternative to using the biasing member 175, pressurized fluid flow through the flow paths 23B may apply a force to and move the actuating member 150 to rotate the body 125 via the arm 155 and thereby actuate the valve assembly 100 into the closed position as described above. As illustrated, the flow paths 23B may be arranged parallel to the longitudinal axis of the casing 20.

Figure 10A:
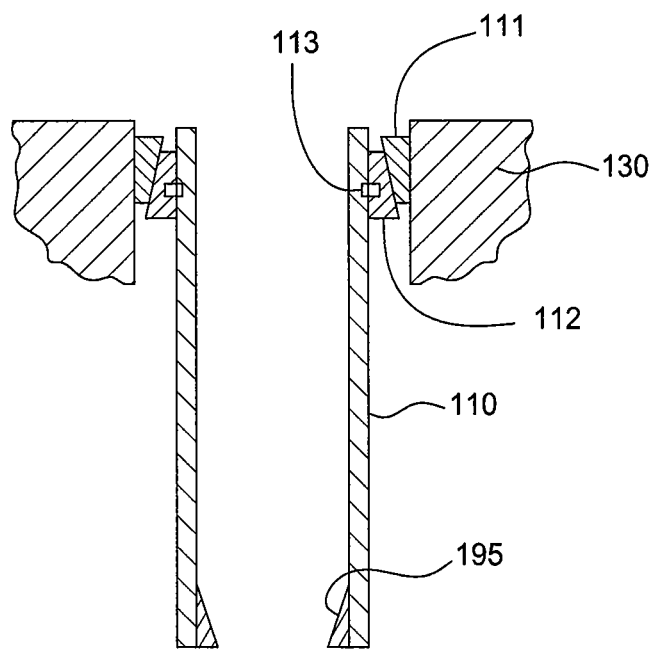
FIG. 10A illustrates a sleeve member of the valve assembly according to one embodiment.

FIG. 10A illustrates the sleeve member 110, which temporarily holds the valve assembly 100 in the open position according to one embodiment. The sleeve member 110 is attached to the housing 130 by an interference fit connection comprising a first ring member 111 and a second ring member 112. The first ring member 111 may be coupled to the housing 130 in a manner that permits thermal expansion and contraction of the first ring member 111 relative to the housing 130. The second ring member 112 may be secured within the first ring member 111 by an interference fit. The ring members 111, 112 include opposing tapered surfaces (each surface having less than about a 15 degree tapered angle for example) which provide a self locking mechanism. In particular, the opposing tapered surfaces prevent the second ring member 112 from being pushed upward through the first ring member 111. In addition, the engagement between the low degree (e.g. less than 15 degrees) opposing tapered surfaces of the ring members 111, 112 produces a sufficient amount of friction to secure the second ring member 112 against the first ring member 111. These self locking features, in addition to the interference fit, help prevent the second ring member 112 and thus the sleeve member 110 from being prematurely removed from the valve assembly 100. The opposing tapered surfaces also increase the contact surface area between the ring members 111, 112, while enabling a short travel distance required to release the second ring member 112 from the interference fit with the first ring member 111 at a predetermined force. The sleeve member 110 may be coupled to the second ring member 112 by a connection 113. The sleeve member 110 extends into the housing 130, and in particular into the bore 140 of the body 125 to hold the valve assembly 100 in the open position. The sleeve member 110 includes the seat 195 configured to receive the fluid-blocking member 135, which is used to generate a sufficient pressurized fluid force to release the second ring member 112 out of the interference fit with the first ring member 111. The sleeve member 110 is thereby released from holding the valve assembly 100 in the open position as described above with respect to FIGS. 2 and 2A.

Figure 10B:
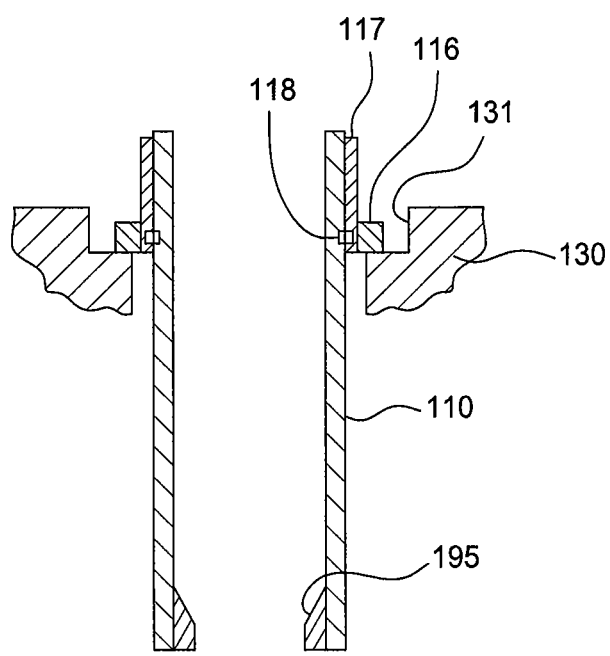
FIG. 10B illustrates the sleeve member of the valve assembly according to one embodiment.

FIG. 10B illustrates the sleeve member 110, which temporarily holds the valve assembly 100 in the open position according to one embodiment. The sleeve member 110 is attached to the housing 130 by an interference fit connection comprising a first ring member 116 and a second ring member 117. The first ring member 116 may be secured in a recess 131 of the housing 130 in a manner that permits thermal expansion and contraction of the ring member 116 relative to the housing 130. The second ring member 117 may be secured within the first ring member 111 by an interference fit. The length of the second ring member 117 may be adjusted as desired to provide a predetermined amount of travel distance that the second ring member 117 must move before being released from the interference fit with the first ring member 116. The length of the second ring member 117 may also determine the amount of time, force, and/or degree or length of interference necessary to remove the second ring member 117 from the first ring member 116. Providing an appropriate length of the second ring member 117 may prevent premature release of the sleeve member 110. The sleeve member 110 may be coupled to the second ring member 117 by a connection 118. The sleeve member 110 extends into the housing 130, and in particular into the bore 140 of the body 125 to hold the valve assembly 100 in the open position. The sleeve member 110 includes the seat 195 configured to receive the fluid-blocking member 135, which is used to generate a sufficient pressurized fluid force to release the second ring member 117 out of the interference fit with the first ring member 116. The sleeve member 110 is thereby released from holding the valve assembly 100 in the open position as described above with respect to FIGS. 2 and 2A.

In one embodiment, the ring members 111, 112 and/or 116, 117 may be pressed together to form the interference fit. In one embodiment, the outer ring member may be heated and/or the inner ring member may be cooled prior to being inserted into the outer ring. The rings may then be allowed to thermally expand and/or contract to form the interference fit. In one embodiment, the ring members 111, 112 and/or 116, 117 may be formed from the same material, such as brass or bronze. In one embodiment, the ring members 111, 112 and/or 116, 117 may be formed from materials having substantially the same coefficients of thermal expansion. The valve assembly 100 may include one or more inference fit connections, and/or other connections operable to temporarily secure the sleeve member 110 within the valve assembly 100. The valve assembly 100 may include one or more sleeve members 110 to temporarily secure the valve assembly 100 in the open position.

Figure 11:
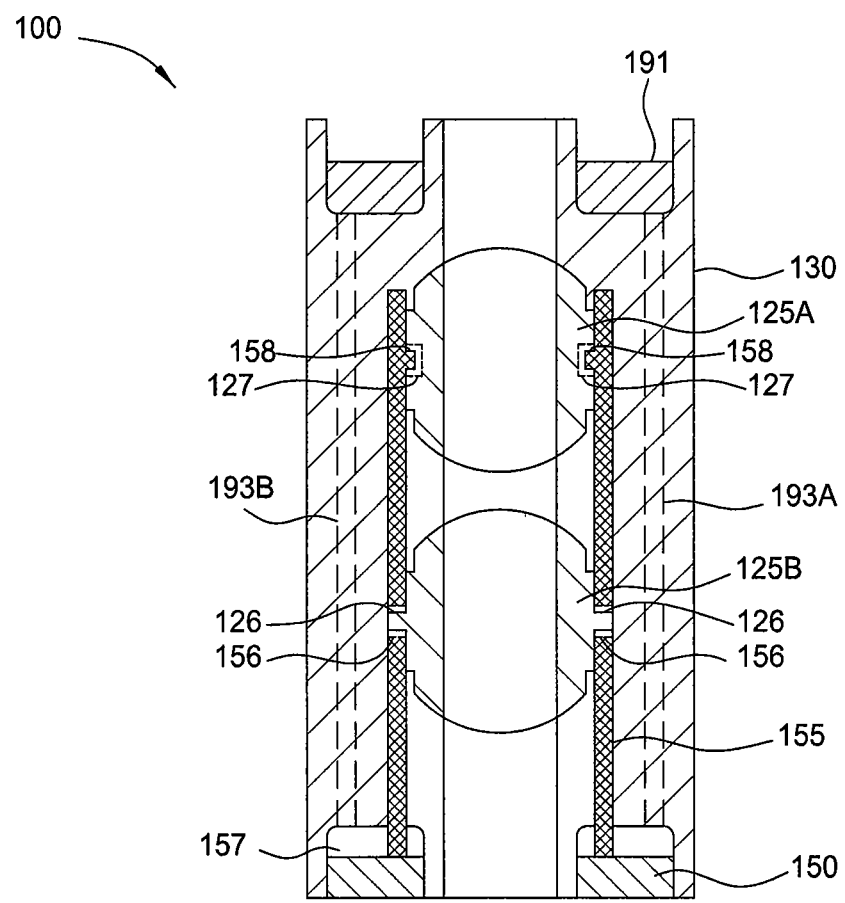
FIG. 11 illustrates the valve assembly including two ball valves according to one embodiment.

FIG. 11 illustrates the valve assembly 100 having two valve bodies 125A, 125B disposed in the housing 130, each rotatable by the one or more arms 155 and the actuating member 150. The valve assembly 100 may have one or more valve bodies 125, and each valve body 125 may be simultaneously or independently actuatable by (the same or different) one or more arms 155 and/or actuating members 150. As illustrated, the upper body 125A includes a slot 127 for receiving a pin member 158 that is coupled to or integral with the arm 155. As further illustrated, the lower body 125B includes a pin member 126 that is coupled to or integral with the body 125B; and the arm 155 includes a slot 156 for receiving the pin member 126. As the actuating member 150 moves the arm 155 axially, the pin members 126, 158 and the slots 127, 156 interact to cause the body 125A, 125B to rotate within the housing 130 between the open and closed positions. The valve assembly 100 may include any number and/or combination of slot and pin arrangements, or other arrangements operable to convert linear motion to rotational motion for the operations described herein.

One or more components of the valve assembly 100, including the entire valve assembly 100, may be formed from a material that is drillable using conventional drill bits (e.g. polycrystalline diamond composite bits) and conventional drilling methods known in the art. One or more components of the valve assembly 100 may be formed from a composite material, a ceramic material, a material coated with a ceramic, and/or a soft metallic material. One or more components of the valve assembly 100 may be formed from aluminum, brass, bronze, fiberglass, plastic, cement, and/or rubber.

In one embodiment, when desired, a drill string having a rotatable drilling member may be lowered into the casing 20 to drill out and remove the valve assembly 100 for conducting further operations through the casing 20. In one embodiment, the drill string may include an impact mechanism, such as a conventional fluid-actuated jarring tool, to break or fracture the valve assembly 100 into one or more pieces for removal. The impact mechanism may be operable to axially force the drill bit into impacting engagement with the valve assembly 100 one or more times. In one embodiment, the combination of impact drilling methods and subsequent rotational drilling methods may be used to remove the valve assembly 100 from the casing 20 and the wellbore.

Figure 4B:
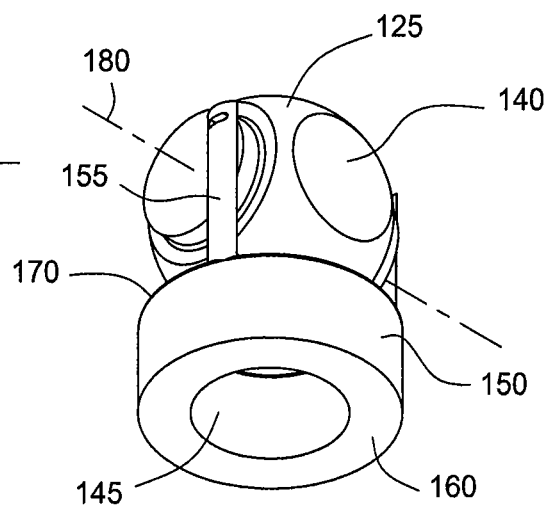
FIG. 4B illustrates the piston and the spherical body of the valve assembly when the valve assembly is in the closed position.

In one embodiment, the valve assembly 100 may include one or more anti-rotation mechanisms to ensure effective drill out of the valve assembly 100. The anti-rotation mechanism may be operable to prevent one or more components of the valve assembly 100 from rotating within the casing 20, which may obstruct or prevent drill out of that component or other components when using a conventional rotating drill bit. In one embodiment, the body 125 may include one or more raised or projecting portions on the sides of the body 125 (as illustrated in FIGS. 3B and 4B) which engage the housing 130 for preventing rotation of the body 125 about an axis perpendicular to the axis 180 (also illustrated in FIGS. 3B and 4B) during a drill out operation. In one embodiment, the inner and/or outer diameters of one or more components of the valve assembly 100, such as the piston 191, the housing 130, and/or the actuating member 150, may be formed in a non-round shape, including but not limited to an elliptical, oval, or eccentric shape to prevent rotation about an axis parallel to the longitudinal axis of the casing 20 during a drill out operation. In one embodiment, one or more components of the valve assembly 100 may be pinned or keyed to another component to prevent rotation about the central axis of the casing 20 during a drill out operation. In one embodiment, a portion of the cement supplied through the bores of the plug members 60, 70 and/or the valve assembly 100 may remain and harden within the bores, which may also help secure the wellbore components from rotating within the casing 20 during a drill out operation.

Figure 12:
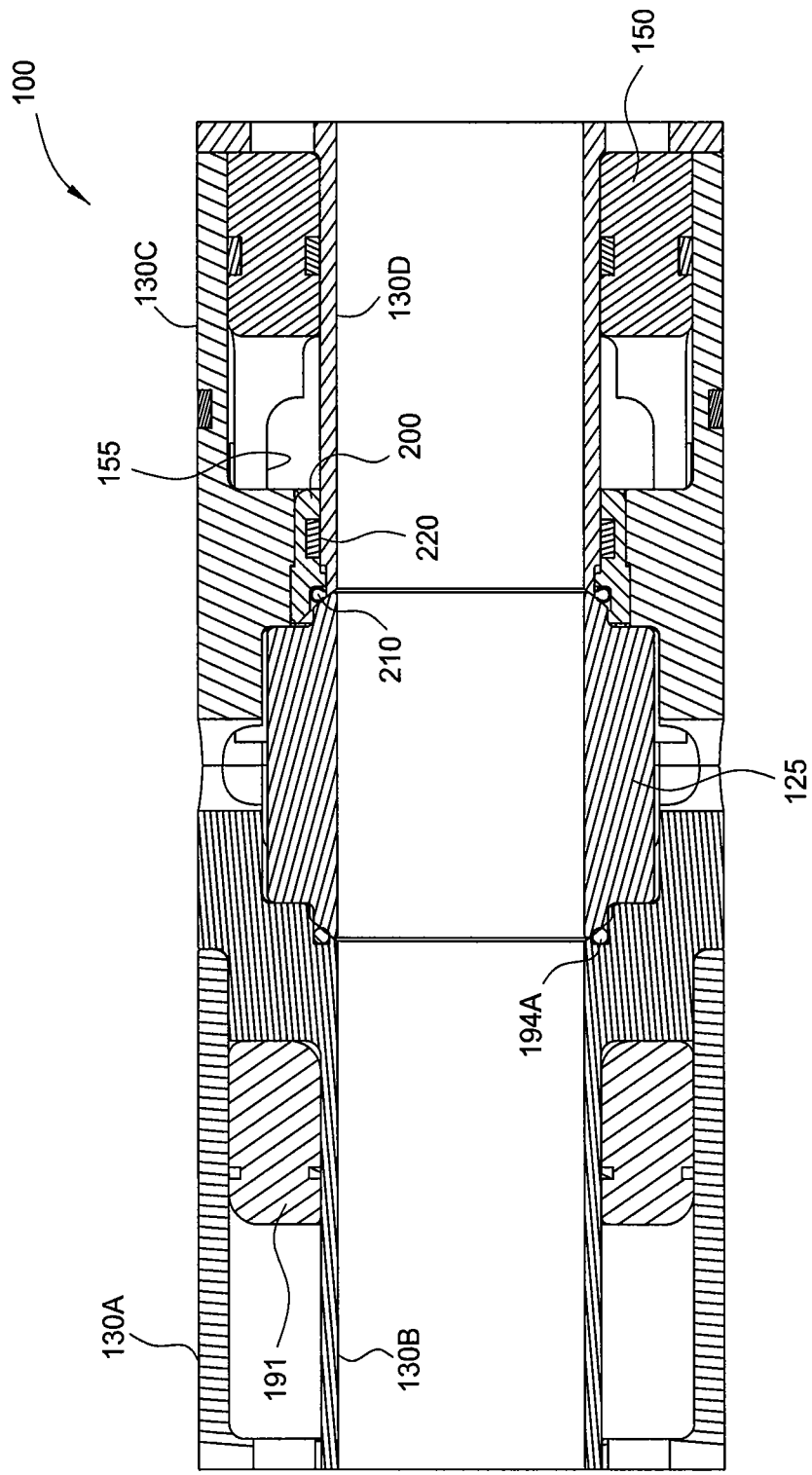
FIG. 12 illustrates a sectional view of the valve assembly according to one embodiment.

FIG. 12 illustrates the valve assembly 100 in an open position according to one embodiment. A full description of every component and operation of the valve assembly 100 illustrated in FIG. 12 is omitted for brevity but can be found in the above description. As illustrated, the valve assembly 100 includes an upper housing assembly comprising an outer housing 130A coupled to an inner housing 130B and enclosing piston 191. The valve assembly 100 further includes a lower housing assembly comprising an outer housing 130C coupled to an inner housing 130D and enclosing actuating member 150. Supported between the upper and lower housing assemblies is a body 125, such as a rotatable ball valve member as known in the art, which controls fluid flow through the valve assembly 100. In particular, one or more arms 155 of the actuating member 150 are coupled to the body 125 for moving or rotating the body 125 between open and closed positions as described herein. A wiper ring/seal 194A may be positioned between the body 125 and the inner housing 130B. At the opposite end of the body 125, a seal ring 210 is supported by a sleeve member 200 for contact with the body 125 as further described below. The sleeve member 200 may be movably supported by an inner shoulder of the outer housing 130C and/or an inner shoulder of the inner housing 130D. A seal 220 may be disposed between the sleeve member 200 and the inner housing 130D.

Upon actuation of the valve assembly 100 to the closed position, the actuating member 150 may move toward the body 125 and contact the sleeve member 200. The actuating member 150 contacts and moves the sleeve member 200 toward the body 125 to force the seal 210 into sealing engagement with the body 125. The seal 210 may be or may not be in contact with the body 125 (e.g. when in the open position) prior to the force applied by the actuating member 150. The body 125 may be rotated into the fully closed position prior to the actuating member 150 applying a force to the sleeve member 200 and thus the seal 210. The additional load provided by the actuating member 150 on the seal 210 assists with the valve assembly 100 being movable into in a fully closed and sealed position.

Upon actuation of the valve assembly 100 to the open position, the actuating member 150 may move away from the body 125 and out of contact with the sleeve member 200. The sleeve member 200 may also move away from the body 125 to move the seal 210 out of sealing engagement with the body 125. The seal 210 may be or may not be in contact with the body 125 (e.g. when in the open position) after the force from the actuating member 150 is removed. The body 125 may be rotated into the fully open position as described herein. The travel of the sleeve member 200 may be limited by the shoulders on the outer and inner housings 130C, 130D. A biasing member, such as a spring, may be provided to assist with retracting the sleeve member 200 and/or the seal 210 from engagement with the body 125 when moved to the open position. The sleeve member 200 supports and protects the seal 210 during operation of the valve assembly 100. The seal 210 may be formed from a metallic material, an elastomeric material, and/or other sealing materials known in the art.

Figure 13:
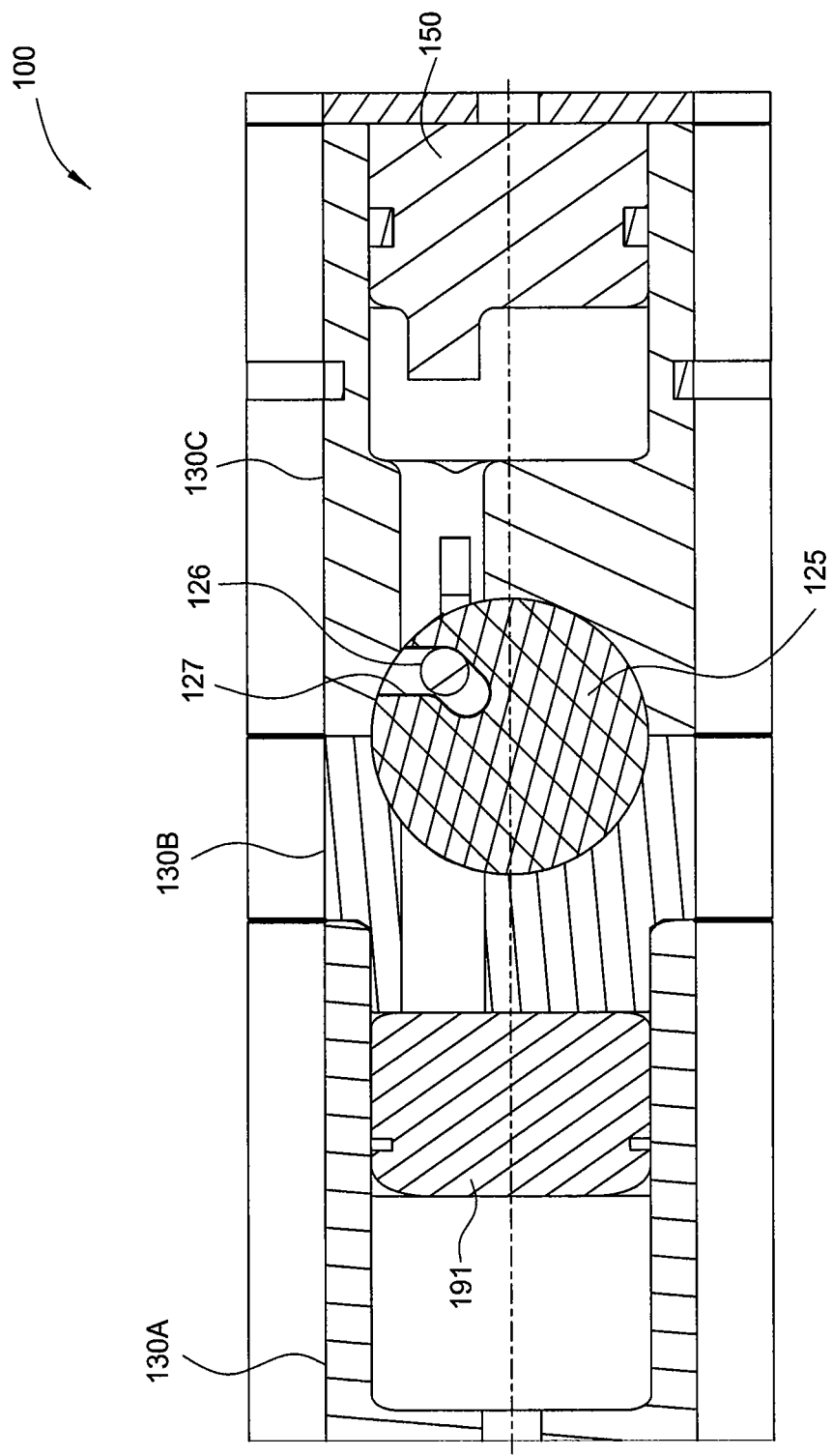
FIG. 13 illustrates another sectional view of the valve assembly according to one embodiment.

FIG. 13 illustrates another sectional view of the valve assembly 100 according to one embodiment. A full description of every component and operation of the valve assembly 100 illustrated in FIG. 13 is omitted for brevity but can be found in the above description. As illustrated, the body 125 may include one or more slots (or groove) 127 that interact with one or more pin members 126 coupled to or formed integral with the arms 155 (see FIGS. 3B, 4B, 11) of the actuating member 150. The slot 127 may include a straight (horizontal or vertical) portion and an angled portion. In one embodiment, the pin member 126 may be coupled to or formed integral with the body 125, and the slot 127 may be formed on the actuating member 150, such as within the arms 155 (see FIGS. 3B, 4B, 11).

Upon actuation of the valve assembly 100 to the closed position, the actuating member 150 moves toward the body 125, and the pin member 126 interacts with (e.g. travels within and/or contacts) the straight portion of the slot 127 to rotate the body 125 to the closed position. When the body 125 is fully rotated to the closed position, further movement of the actuating member 150 moves the pin member 126 within the angled portion of the slot 127. The body 125 may not rotate when the pin member 126 moves within the angled portion of the slot 127. Movement of the pin member 126 into the angled potion of the slot 127 assists with locking the valve assembly 100 in the closed position and prevents inadvertent rotation of the body 125 out of the closed position. Upon actuation of the valve assembly 100 to the open position, the actuating member 150 retracts, and the pin member 126 moves out of the angled portion of the slot 127 and into interaction with the straight portion of the slot 127 to rotate the body into the open position.

One or more embodiments described herein may be combined with (as a whole or in part) one or more other embodiments described above.

While the foregoing is directed to embodiments of the invention, other and further embodiments of the invention may be devised without departing from the basic scope thereof, and the scope thereof is determined by the claims that follow.

The invention claimed is:

1. A ball valve for use in a cementing operation, the ball valve comprising:
a housing with a fluid flow path and a bore;
a spherical body disposed within the bore of the housing;
an actuating member axially movable relative to the spherical body between a first position and a second position, wherein the movement of the actuating member causes the spherical body to rotate within the housing;
a biasing member operatively coupled to the actuating member and configured to bias the actuating member into the second position; and
a first piston surface exposed to fluid in the fluid flow path and a second piston surface exposed to fluid in the bore.

2. The ball valve of claim 1, wherein a bore of the spherical body is aligned with a longitudinal axis of the housing when the actuating member is in the first position, thereby allowing fluid flow through the bore of the spherical body.

3. The ball valve of claim 2, wherein the bore of the spherical body is misaligned with the longitudinal axis of the housing when the actuating member is in the second position, thereby blocking fluid flow through the bore of the spherical body.

4. The ball valve of claim 1, further comprising a piston movable relative to the housing, wherein fluid in the fluid flow path is in communication with the actuating member, and wherein the piston is movable to pressurize the fluid in the flow path to move the actuating member toward one of the first and second positions.

5. The ball valve of claim 1, wherein the housing includes a hole that is configured as the fluid flow path through the housing, wherein fluid pumped through the fluid flow path causes the actuating member to move from the second position to the first position.

6. The ball valve of claim 1, wherein the actuating member is attached to the spherical body via an arm using a pin and slot arrangement.

7. The ball valve of claim 1, further comprising a sleeve member operable to temporarily prevent the spherical body from rotating within the housing, wherein the sleeve member is coupled to the housing by at least one of a shearable connection and an interference fit connection.

8. The ball valve of claim 1, wherein the actuating member includes a bore that aligns with a bore in the spherical body when the actuating member is in the first position and the bore in the actuating member is misaligned with the bore in the spherical body when the actuating member is in the second position.

9. The ball valve of claim 1, further comprising a sleeve member for supporting a seal ring, wherein the actuating member is movable into contact with the sleeve member to move the seal ring into sealing engagement with the spherical body.

10. The ball valve of claim 1, wherein fluid in the fluid flow path is isolated from fluid in the bore.

11. The ball valve of claim 1, wherein the first and second piston surfaces are on the actuating member.

12. The ball valve of claim 1, wherein the first piston surface is on a piston and the second piston surface is on the actuating member.

13. The ball valve of claim 1, wherein the first piston surface and the second piston surface have an equal surface area.

14. A method of using a ball valve in a cementing operation, the method comprising:
positioning a casing in a wellbore, wherein the casing includes the ball valve with a spherical body;
pumping cement through the casing and the ball valve into an annulus formed between the casing and the wellbore;
maintaining the ball valve in an opened position by application of fluid pressure in the casing; and moving the spherical body of the ball valve from the opened position towards a closed position using both a biasing member and a pressurized fluid acting on a piston area of the ball valve.

15. The method of claim 14, wherein the spherical body of the ball valve is held in the opened position by a sleeve member connected to the ball valve by a releasable connection.

16. The method of claim 15, further comprising removing the sleeve member from the ball valve by releasing the connection, thereby allowing the spherical body of the ball valve to move from the opened position to the closed position.

17. The method of claim 14, further comprising applying a fluid pressure to the ball valve to move the spherical body of the ball valve between the opened position and the closed position.

18. The method of claim 14, further comprising dropping a plug member prior to pumping cement through the casing.

19. The method of claim 14, further comprising drilling out the ball valve to remove the ball valve from the casing, and providing the ball valve with an anti-rotation mechanism to prevent one or more components of the ball valve from rotating during rotational drilling of the ball valve.

20. The method of claim 14, further comprising securing the ball valve in the casing using a retaining cement member, and flowing fluid through a flow path of the retaining cement member to actuate the ball valve from the opened position to the closed position.

21. The method of claim 14, further comprising actuating an actuating member of the ball valve into contact with a sleeve member, and moving the sleeve member and a seal ring supported by the sleeve member into contact with the spherical body.

22. The method of claim 14, wherein the ball valve is in the opened position when the casing is positioned in the wellbore.

23. The method of claim 14, further comprising moving the spherical body of the ball valve from the closed position to the opened position using a second pressurized fluid acting on a second piston area of the ball valve.

24. The method of claim 23, wherein the pressurized fluid is isolated from the second pressurized fluid.

25. The method of claim 14, further comprising decreasing the application of fluid pressure in the casing, thereby causing the spherical body of the ball valve to move from the opened position towards the closed position.

26. The method of claim 14, further comprising axially moving an actuating member relative to the spherical body in response to fluid pressure in the casing, thereby moving the spherical body between the opened and closed positions.

27. The method of claim 26, wherein the actuating member includes the piston area and fluid pressure in the casing acts on the piston area to move the actuating member from a first position toward a second position relative to the spherical body.

28. The method of claim 27, wherein the actuating member includes a second piston area exposed to a fluid path isolated from the casing and fluid pressure in the fluid path acts on the second piston area to move the actuating member from the second position toward the first position relative to the spherical body.

29. A valve assembly comprising:
a housing having a fluid flow path and a bore;
a spherical body having a bore, wherein the spherical body is rotatable within the housing between an opened position in which the bore of the spherical body aligns with the bore of the housing and a closed position in which the bore of the spherical body is misaligned with the bore of the housing; and
an actuating member axially movable relative to the spherical body and configured to move the spherical body between the opened position and the closed position;
a biasing member operatively coupled to the actuating member, the biasing member configured to bias the spherical body in the closed position;
a first piston area exposed to fluid in the fluid flow path and a second piston area exposed to fluid in the bore of the housing.

30. The valve assembly of claim 29, further comprising a connection member disposed between the actuating member and the spherical body.

31. The valve assembly of claim 29, further comprising a sleeve member disposed within the bore of the housing and the bore of the spherical body to maintain the spherical body in the opened position.

32. The valve assembly of claim 31, wherein the sleeve member is attached to the housing via a releasable connection.

33. The valve assembly of claim 29, wherein at least one of the housing, the spherical body, and the actuating member are formed from a drillable material.

34. The valve assembly of claim 29, further comprising at least two spherical bodies rotatable within the housing between the opened position and the closed position.

35. The valve assembly of claim 34, wherein the actuating member is operable to move the at least two spherical bodies using one or more arms engaged with the bodies by a pin and slot arrangement.

36. The valve assembly of claim 29, wherein fluid in the fluid flow path is isolated from the fluid in the bore of the housing.

37. The valve assembly of claim 29, wherein the first and second piston areas are on the actuating member.

38. The valve assembly of claim 29, wherein the first piston area is on a piston and the second piston area is on the actuating member.

39. A ball valve for use in a cementing operation, the ball valve comprising:
a housing with a fluid flow path and a bore;
a spherical body disposed within the bore of the housing;
an actuating member movable relative to the housing between a first position and a second position, wherein the movement of the actuating member causes the spherical body to rotate within the housing;
a biasing member operatively coupled to the actuating member and configured to bias the actuating member toward the second position; and
a piston having a first piston surface exposed to fluid in the bore and a second piston surface exposed to the fluid flow path and the actuating member having a first piston surface exposed to fluid in the bore and a second piston surface exposed to the fluid flow path.

40. The ball valve of claim 39, wherein the fluid flow path is isolated from the bore of the housing.

41. The ball valve of claim 39, wherein the actuating member is axially movable relative to the spherical body between the first and second positions.

42. The ball valve of claim 39, wherein the piston is movable to pressurize fluid in the flow path to move the actuating member toward one of the first and second positions.

43. A valve assembly comprising:

a housing having a fluid flow path and a bore;

a spherical body having a bore, wherein the spherical body is rotatable within the housing between an open position in which the bore of the spherical body aligns with the bore of the housing and a closed position in which the bore of the spherical body is misaligned with the bore of the housing; and an actuating member axially movable relative to the spherical body to move the spherical body between the open position and the closed position;

a biasing member operatively coupled to the actuating member, the biasing member configured to bias the spherical body in the closed position;

a first piston area on the actuating member exposed to fluid in the fluid flow path and a second piston area on the actuating member exposed to fluid in the bore of the housing.

44. The ball valve of claim 43, wherein the fluid flow path is isolated from the bore of the housing.

45. The valve assembly of claim 43, further comprising a piston having a first piston surface exposed to fluid in the bore and a second piston surface exposed to the fluid flow path, wherein the piston is movable to pressurize the fluid in the flow path to move the actuating member toward one of the first and second positions.

* * * * *